United States Patent
Thijssen et al.

(10) Patent No.: US 10,165,661 B2
(45) Date of Patent: Dec. 25, 2018

(54) PROXY FOR LEGACY LIGHTING CONTROL COMPONENT

(71) Applicant: PHILIPS LIGHTING HOLDING B.V., Eindhoven (NL)

(72) Inventors: Paulus Thomas Arnoldus Thijssen, Goirle (NL); George Frederic Yianni, Eindhoven (NL)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 0 days.

(21) Appl. No.: 15/323,526

(22) PCT Filed: Jun. 11, 2015

(86) PCT No.: PCT/IB2015/054424
§ 371 (c)(1),
(2) Date: Jan. 3, 2017

(87) PCT Pub. No.: WO2016/001780
PCT Pub. Date: Jan. 7, 2016

(65) Prior Publication Data
US 2017/0150576 A1    May 25, 2017

Related U.S. Application Data

(60) Provisional application No. 62/020,473, filed on Jul. 3, 2014.

(51) Int. Cl.
*H05B 37/02* (2006.01)
*H04L 12/28* (2006.01)

(52) U.S. Cl.
CPC ....... *H05B 37/029* (2013.01); *H05B 37/0227* (2013.01); *H05B 37/0245* (2013.01)

(58) Field of Classification Search
CPC .. H05B 37/02; H05B 37/029; H05B 37/0227; H05B 37/0254; H05B 37/0245;
(Continued)

(56) References Cited

U.S. PATENT DOCUMENTS 6,016,038 A     1/2000   Mueller et al.
6,160,359 A * 12/2000   Fleischmann ...... H05B 37/0254
                                                                   315/294

(Continued)

FOREIGN PATENT DOCUMENTS

EP        1204300 A1   8/2002
JP        2005277597 A   10/2005
WO      2013164726 A2   11/2013

*Primary Examiner* — Thai Pham
(74) *Attorney, Agent, or Firm* — Meenakshy Chakravorty (57) ABSTRACT

Methods, systems and computer-readable media or provided for implementing a proxy for a legacy lighting control component. A lighting unit (102) may be polled for data indicative of a lighting state of the lighting unit. It may be determined that the lighting state of the lighting unit corresponds to a predetermined lighting state. A predetermined lighting scene triggered by transition of the lighting unit into the predetermined lighting state may be identified, and one or more other lighting units may be caused to implement the predetermined lighting scene. In some embodiments, a user interface may be operable to create an association between a legacy switch or sensor (108) that controls a first lighting unit (102a) and a predetermined lighting scene to be implemented at least in part by a second lighting unit (102b-f), e.g., leaving a direct association between the first lighting unit and the legacy switch or sensor transparent to a user.

19 Claims, 4 Drawing Sheets

(58) Field of Classification Search
CPC . H04L 12/28; H04L 12/282; H04L 2012/285; H04L 2012/2841
See application file for complete search history.

(56) References Cited

U.S. PATENT DOCUMENTS

| | | | |
|---|---|---|---|
| 6,211,626 B1 | 4/2001 | Lys et al. | |
| 7,964,989 B1* | 6/2011 | Puschnigg | G06F 1/266 307/116 |
| 8,368,310 B1* | 2/2013 | Roosli | H05B 37/0245 315/152 |
| 9,590,427 B2* | 3/2017 | Davis | H05B 37/0272 |
| 9,832,833 B1* | 11/2017 | Pipe-Mazo | H05B 33/0854 |
| 2003/0137258 A1 | 7/2003 | Piepgras et al. | |
| 2012/0098445 A1 | 4/2012 | Park et al. | |
| 2012/0098446 A1 | 4/2012 | Kim et al. | |
| 2017/0280534 A1* | 9/2017 | Dimberg | G01D 5/02 |

* cited by examiner

FIG. 4

PROXY FOR LEGACY LIGHTING CONTROL COMPONENT

CROSS-REFERENCE TO PRIOR APPLICATIONS

This application is the U.S. National Phase application under 35 U.S.C. § 371 of International Application No. PCT/IB2015/054424, filed on Jun. 11, 2015,which claims the benefit of U.S Patent Application No. 62/020,473, filed on Jul. 3, 2014.These applications are hereby incorporated by reference herein.

TECHNICAL FIELD

The present invention is directed generally to lighting control. More particularly, various inventive methods and apparatus disclosed herein relate to implementing a proxy for a legacy lighting control component.

BACKGROUND

Digital lighting technologies, i.e., illumination based on semiconductor light sources, such as light-emitting diodes (LEDs), offer a viable alternative to traditional fluorescent, HID, and incandescent lamps. Functional advantages and benefits of LEDs include high energy conversion and optical efficiency, durability, lower operating costs, and many others. Recent advances in LED technology have provided efficient and robust full-spectrum lighting sources that enable a variety of lighting effects in many applications. Some of the fixtures embodying these sources feature a lighting module, including one or more LEDs capable of producing different colors, e.g., red, green, and blue, as well as a processor for independently controlling the output of the LEDs in order to generate a variety of colors and color-changing lighting effects, for example, as discussed in detail in U.S. Patent. Nos. 6,016,038 and 6,211,626, incorporated herein by reference.

A so-called "connected" lighting system may include so-called "connected" lighting units capable of communicating with, controlling, and/or being controlled by other devices, such as other connected lighting units, a lighting system bridge that controls the connected lighting system, mobile computing devices (e.g., smart phones), and so forth. Connected lighting units may be retrofitted into an environment, e.g., to replace (or supplement) "legacy" lighting units that are controlled by "legacy" lighting control components, such as traditional switches (e.g., wall switches, dimmers, lamp switches, clappers, etc.) or sensors (e.g., presence, light, touch, etc.). While it is possible to replace legacy lighting control components with more flexible connected lighting control components (e.g., "smart" wall units, smart phones with lighting control applications, etc.) that control connected lighting units wirelessly, such installation may be expensive, cumbersome or otherwise undesirable. Moreover, some users may not desire more robust control of lighting, and may prefer to continue controlling connected lighting units using legacy lighting control components. For instance, in a connected lighting system, a lighting system bridge may represent a single point of failure, and if it fails and there are no other ways to connected control lighting units, safety may become a concern. Thus, there is a need in the art to incorporate legacy lighting control components into a connected lighting system.

SUMMARY

The present disclosure is directed to inventive methods and apparatus for associating operation of a legacy lighting control component with implementation of a lighting scene by one or more connected lighting units. In a connected lighting system that includes multiple connected lighting units, one or more connected lighting units may be controlled by a legacy lighting control component such as a legacy switch or sensor. The switch or sensor may only be designed to alter power provided to the lighting unit (causing it to energize to various extents), and may be incapable of exchanging information with one or more components of the lighting units.

Accordingly, one or more network nodes associated with the lighting system may operate as a proxy for that switch or sensor. The proxy may detect when a lighting unit controlled by that switch or sensor transitions into a particular lighting state in response to operation of that switch or sensor. In response to the detection, the proxy may cause, directly (e.g., by issuing commands itself) or indirectly (e.g., by notifying a lighting system bridge of the transition), one or more other lighting units of the lighting system to implement respective aspects of a selected lighting scene. In some embodiments, the association between the selected lighting scene and the lighting state of the lighting unit controlled by the legacy lighting control component may be represented abstractly, e.g., as an association directly between the selected lighting scene and the legacy lighting control component.

Generally, in one aspect, a lighting control method may include: polling, by a network node, a lighting unit for data indicative of a lighting state of the lighting unit; determining, by a network node based on the polling, that the lighting state of the lighting unit corresponds to a predetermined lighting state; identifying, by the network node based on the determining, a predetermined lighting scene triggered by transition of the lighting unit into the predetermined lighting state; causing, by the network node, one or more other lighting units to implement the predetermined lighting scene; determining, by the network node based on the polling, that the lighting unit has been transitioned from the predetermined lighting state into another lighting state; and causing, by the network node, the one or more other lighting units to cease implementation of the predetermined lighting scene in response to determining that the lighting unit has been transitioned from the predetermined lighting state into the another lighting state.

In various embodiments, the lighting control method may further include providing, at a computing device in communication with the network node, a user interface operable by a user to create an association directly between a legacy switch or sensor that controls the lighting state of the lighting unit and the predetermined lighting scene. In various versions, the user interface is further operable by a user to create an association between the legacy switch or sensor and the lighting unit.

In various embodiments, the predetermined lighting state is an energized lighting state and the another lighting state is a de-energized lighting state. In various versions, determining that a lighting unit has transitioned into the energized lighting state may include determining, by the network node, that the lighting unit has been energized by operation of a legacy switch. In various versions, determining that a lighting unit has transitioned into the energized lighting state may include determining, by the network node, that the lighting unit has been energized in response to a signal from a legacy sensor. In various versions, the sensor is a presence sensor or a light sensor.

In various embodiments, the polling may include periodically polling, by the network node, the lighting unit for the data indicative of the lighting state of the lighting unit. In various embodiments, determining that a lighting unit has transitioned into a predetermined lighting state comprises determining, by the network node, that the lighting unit is reachable. In various embodiments, causing the one or more other lighting units to implement the predetermined lighting scene comprises transmitting, by the network node to the one or more other lighting units, one or more commands to implement one or more respective aspects of the predetermined lighting scene.

In various embodiments, causing the one or more lighting units to implement the predetermined lighting scene may include transmitting, by the network node to a lighting system bridge, an indication that the lighting state of the lighting unit corresponds to the predetermined lighting state. In various embodiments, causing the one or more lighting units to implement the predetermined lighting scene may include transmitting, by the network node to a lighting system bridge, a command to cause the lighting system bridge to cause the one or more lighting units to implement the predetermined lighting scene.

In various embodiments, non-transitory computer-readable media may be provided that include instructions that, in response to execution of the instructions by a network node, cause the network node to perform one or more of the methods described above.

In another aspect, a lighting system bridge for controlling a lighting system may be configured to: receive, from a computing device communicably coupled with the lighting system bridge, data indicative of a user-created association between a legacy switch or sensor that controls a first lighting unit of the lighting system and a lighting scene to be implemented at least in part by a second lighting unit of the lighting system; determine a lighting state into which the first lighting unit is transitioned in response to activation of the legacy switch or sensor; create an association between the determined lighting state and the lighting scene; and cause at least the second lighting unit to implement the lighting scene in response to a determination that the first lighting unit has transitioned into the determined lighting state.

In various embodiments, the lighting system bridge may be further configured to periodically poll the first lighting unit for data indicative of a current lighting state of the first lighting unit, wherein the determination that the lighting unit has transitioned into the determined lighting state is based on a result of the poll. In various versions, the lighting system bridge may be further configured to: determine, based on the data indicative of the current lighting state, that the lighting unit has been transitioned from the determined lighting state into another lighting state; and causing, by the network node, the one or more lighting units to cease implementation of the lighting scene.

In various embodiments, the lighting system bridge may be further configured to receive, from the computing device, data indicative of an association between the legacy switch or sensor and the first lighting unit. In various embodiments, the lighting system bridge may be further configured to receive, from the computing device, data indicative of the lighting state into which the first lighting unit is transitioned in response to activation of the legacy switch or sensor.

In another aspect, a mobile computing device may include: one or more processors; a communication interface operably coupled with the one or more processors; a display; and memory storing instructions that, in response to execution of the instructions by the one or more processors, cause the one or more processors to: render, on the display, a user interface operable by a user to create an association between a legacy switch or sensor that controls a first lighting unit and a predetermined lighting scene to be implemented at least in part by a second lighting unit; and provide, via the communication interface to a network node in communication with the first and second lighting units, data indicative of the association.

In various embodiments, the association is a first association, and the user interface is further operable by a user to create a second association between the legacy switch or sensor and the first lighting unit. In various embodiments, the user interface is further operable by a user to provide data indicative of a lighting state into which the first lighting unit is transitioned in response to activation of the legacy switch or sensor. In various embodiments, the association is a first association, and the user interface is further operable by a user to create a second association between a lighting state into which the first lighting unit is transitioned in response to activation of the legacy switch or sensor and the predetermined lighting scene.

As used herein for purposes of the present disclosure, the term "LED" should be understood to include any electroluminescent diode or other type of carrier injection/junction-based system that is capable of generating radiation in response to an electric signal. Thus, the term LED includes, but is not limited to, various semiconductor-based structures that emit light in response to current, light emitting polymers, organic light emitting diodes (OLEDs), electroluminescent strips, and the like. In particular, the term LED refers to light emitting diodes of all types (including semi-conductor and organic light emitting diodes) that may be configured to generate radiation in one or more of the infrared spectrum, ultraviolet spectrum, and various portions of the visible spectrum (generally including radiation wavelengths from approximately 400 nanometers to approximately 700 nanometers). Some examples of LEDs include, but are not limited to, various types of infrared LEDs, ultraviolet LEDs, red LEDs, blue LEDs, green LEDs, yellow LEDs, amber LEDs, orange LEDs, and white LEDs (discussed further below). It also should be appreciated that LEDs may be configured and/or controlled to generate radiation having various bandwidths (e.g., full widths at half maximum, or FWHM) for a given spectrum (e.g., narrow bandwidth, broad bandwidth), and a variety of dominant wavelengths within a given general color categorization.

For example, one implementation of an LED configured to generate essentially white light (e.g., a white LED) may include a number of dies which respectively emit different spectra of electroluminescence that, in combination, mix to form essentially white light. In another implementation, a white light LED may be associated with a phosphor material that converts electroluminescence having a first spectrum to a different second spectrum. In one example of this implementation, electroluminescence having a relatively short wavelength and narrow bandwidth spectrum "pumps" the phosphor material, which in turn radiates longer wavelength radiation having a somewhat broader spectrum.

It should also be understood that the term LED does not limit the physical and/or electrical package type of an LED. For example, as discussed above, an LED may refer to a single light emitting device having multiple dies that are configured to respectively emit different spectra of radiation (e.g., that may or may not be individually controllable). Also, an LED may be associated with a phosphor that is considered as an integral part of the LED (e.g., some types of white LEDs). In general, the term LED may refer to packaged LEDs, non-packaged LEDs, surface mount LEDs, chip-on-board LEDs, T-package mount LEDs, radial package LEDs, power package LEDs, LEDs including some type of encasement and/or optical element (e.g., a diffusing lens), etc.

The term "light source" should be understood to refer to any one or more of a variety of radiation sources, including, but not limited to, LED-based sources (including one or more LEDs as defined above), incandescent sources (e.g., filament lamps, halogen lamps), fluorescent sources, phosphorescent sources, high-intensity discharge sources (e.g., sodium vapor, mercury vapor, and metal halide lamps), lasers, other types of electroluminescent sources, pyro-luminescent sources (e.g., flames), candle-luminescent sources (e.g., gas mantles, carbon arc radiation sources), photo-luminescent sources (e.g., gaseous discharge sources), cathode luminescent sources using electronic satiation, galvano-luminescent sources, crystallo-luminescent sources, kine-luminescent sources, thermo-luminescent sources, triboluminescent sources, sonoluminescent sources, radioluminescent sources, and luminescent polymers.

A given light source may be configured to generate electromagnetic radiation within the visible spectrum, outside the visible spectrum, or a combination of both. Hence, the terms "light" and "radiation" are used interchangeably herein. Additionally, a light source may include as an integral component one or more filters (e.g., color filters), lenses, or other optical components. Also, it should be understood that light sources may be configured for a variety of applications, including, but not limited to, indication, display, and/or illumination. An "illumination source" is a light source that is particularly configured to generate radiation having a sufficient intensity to effectively illuminate an interior or exterior space. In this context, "sufficient intensity" refers to sufficient radiant power in the visible spectrum generated in the space or environment (the unit "lumens" often is employed to represent the total light output from a light source in all directions, in terms of radiant power or "luminous flux") to provide ambient illumination (i.e., light that may be perceived indirectly and that may be, for example, reflected off of one or more of a variety of intervening surfaces before being perceived in whole or in part).

The term "spectrum" should be understood to refer to any one or more frequencies (or wavelengths) of radiation produced by one or more light sources. Accordingly, the term "spectrum" refers to frequencies (or wavelengths) not only in the visible range, but also frequencies (or wavelengths) in the infrared, ultraviolet, and other areas of the overall electromagnetic spectrum. Also, a given spectrum may have a relatively narrow bandwidth (e.g., a FWHM having essentially few frequency or wavelength components) or a relatively wide bandwidth (several frequency or wavelength components having various relative strengths). It should also be appreciated that a given spectrum may be the result of a mixing of two or more other spectra (e.g., mixing radiation respectively emitted from multiple light sources).

For purposes of this disclosure, the term "color" is used interchangeably with the term "spectrum." However, the term "color" generally is used to refer primarily to a property of radiation that is perceivable by an observer (although this usage is not intended to limit the scope of this term). Accordingly, the terms "different colors" implicitly refer to multiple spectra having different wavelength components and/or bandwidths. It also should be appreciated that the term "color" may be used in connection with both white and non-white light.

The term "color temperature" generally is used herein in connection with white light, although this usage is not intended to limit the scope of this term. Color temperature essentially refers to a particular color content or shade (e.g., reddish, bluish) of white light. The color temperature of a given radiation sample conventionally is characterized according to the temperature in degrees Kelvin (K) of a black body radiator that radiates essentially the same spectrum as the radiation sample in question. Black body radiator color temperatures generally fall within a range of approximately 700 degrees K (typically considered the first visible to the human eye) to over 10,000 degrees K; white light generally is perceived at color temperatures above 1500-2000 degrees K.

Lower color temperatures generally indicate white light having a more significant red component or a "warmer feel," while higher color temperatures generally indicate white light having a more significant blue component or a "cooler feel." By way of example, fire has a color temperature of approximately 1,800 degrees K, a conventional incandescent bulb has a color temperature of approximately 2848 degrees K, early morning daylight has a color temperature of approximately 3,000 degrees K, and overcast midday skies have a color temperature of approximately 10,000 degrees K. A color image viewed under white light having a color temperature of approximately 3,000 degree K has a relatively reddish tone, whereas the same color image viewed under white light having a color temperature of approximately 10,000 degrees K has a relatively bluish tone.

The term "lighting fixture" is used herein to refer to an implementation or arrangement of one or more lighting units in a particular form factor, assembly, or package. The term "lighting unit" is used herein to refer to an apparatus including one or more light sources of same or different types. A given lighting unit may have any one of a variety of mounting arrangements for the light source(s), enclosure/housing arrangements and shapes, and/or electrical and mechanical connection configurations. Additionally, a given lighting unit optionally may be associated with (e.g., include, be coupled to and/or packaged together with) various other components (e.g., control circuitry) relating to the operation of the light source(s). An "LED-based lighting unit" refers to a lighting unit that includes one or more LED-based light sources as discussed above, alone or in combination with other non LED-based light sources. A "multi-channel" lighting unit refers to an LED-based or non LED-based lighting unit that includes at least two light sources configured to respectively generate different spectrums of radiation, wherein each different source spectrum may be referred to as a "channel" of the multi-channel lighting unit.

The term "controller" is used herein generally to describe various apparatus relating to the operation of one or more light sources. A controller can be implemented in numerous ways (e.g., such as with dedicated hardware) to perform various functions discussed herein. A "processor" is one example of a controller which employs one or more microprocessors that may be programmed using software (e.g., microcode) to perform various functions discussed herein. A controller may be implemented with or without employing a processor, and also may be implemented as a combination of dedicated hardware to perform some functions and a processor (e.g., one or more programmed microprocessors and associated circuitry) to perform other functions. Examples of controller components that may be employed in various embodiments of the present disclosure include, but are not limited to, conventional microprocessors, application specific integrated circuits (ASICs), and field-programmable gate arrays (FPGAs).

In various implementations, a processor or controller may be associated with one or more storage media (generically referred to herein as "memory," e.g., volatile and non-volatile computer memory such as RAM, PROM, EPROM, and EEPROM, floppy disks, compact disks, optical disks, magnetic tape, etc.). In some implementations, the storage media may be encoded with one or more programs that, when executed on one or more processors and/or controllers, perform at least some of the functions discussed herein. Various storage media may be fixed within a processor or controller or may be transportable, such that the one or more programs stored thereon can be loaded into a processor or controller so as to implement various aspects of the present invention discussed herein. The terms "program" or "computer program" are used herein in a generic sense to refer to any type of computer code (e.g., software or microcode) that can be employed to program one or more processors or controllers.

The term "addressable" is used herein to refer to a device (e.g., a light source in general, a lighting unit or fixture, a controller or processor associated with one or more light sources or lighting units, other non-lighting related devices, etc.) that is configured to receive information (e.g., data) intended for multiple devices, including itself, and to selectively respond to particular information intended for it. The term "addressable" often is used in connection with a networked environment (or a "network," discussed further below), in which multiple devices are coupled together via some communications medium or media.

In one network implementation, one or more devices coupled to a network may serve as a controller for one or more other devices coupled to the network (e.g., in a master/slave relationship). In another implementation, a networked environment may include one or more dedicated controllers that are configured to control one or more of the devices coupled to the network. Generally, multiple devices coupled to the network each may have access to data that is present on the communications medium or media; however, a given device may be "addressable" in that it is configured to selectively exchange data with (i.e., receive data from and/or transmit data to) the network, based, for example, on one or more particular identifiers (e.g., "addresses") assigned to it.

The term "network" as used herein refers to any interconnection of two or more devices (including controllers or processors) that facilitates the transport of information (e.g., for device control, data storage, data exchange, etc.) between any two or more devices and/or among multiple devices coupled to the network. As should be readily appreciated, various implementations of networks suitable for interconnecting multiple devices may include any of a variety of network topologies and employ any of a variety of communication protocols. Additionally, in various networks according to the present disclosure, any one connection between two devices may represent a dedicated connection between the two systems, or alternatively a non-dedicated connection. In addition to carrying information intended for the two devices, such a non-dedicated connection may carry information not necessarily intended for either of the two devices (e.g., an open network connection). Furthermore, it should be readily appreciated that various networks of devices as discussed herein may employ one or more wireless, wire/cable, and/or fiber optic links to facilitate information transport throughout the network.

The term "user interface" as used herein refers to an interface between a human user or operator and one or more devices that enables communication between the user and the device(s). Examples of user interfaces that may be employed in various implementations of the present disclosure include, but are not limited to, switches, potentiometers, buttons, dials, sliders, a mouse, keyboard, keypad, various types of game controllers (e.g., joysticks), track balls, display screens, various types of graphical user interfaces (GUIs), touch screens, microphones and other types of sensors that may receive some form of human-generated stimulus and generate a signal in response thereto.

The phrase "legacy lighting control component" may refer to any number of switches, sensors (e.g., presence, touch, light, motion, etc.) or other actuators that have traditionally been used to control legacy lighting units. A legacy lighting control component may be operated by a user to directly vary an amount of power supplied to a lighting unit. For example, a simple wall switch may be operated to either supply power to a lighting unit, or to not supply power to a lighting unit. Similarly, a dimmer switch may be operated (e.g., turned, moved up/down/sideways) to apply various amounts of power (e.g., along a continuum) to a lighting unit. Legacy lighting control components stand in contrast to, for instance, "connected lighting control components," such as smart phones, tablet computers, smart wall light control mechanisms, and so forth. Connected lighting control components may be operated by a user to send a command to a "connected" lighting unit. The connected lighting unit may include logic (e.g., one or more processors) configured to interpret the command and alter its own light output in response.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

DETAILED DESCRIPTION

A connected lighting system may include connected lighting units capable of communicating with, controlling, and/or being controlled by other devices, such as other connected lighting units, a lighting system bridge, mobile computing devices (e.g., smart phones), and so forth. Connected lighting units may be retrofitted into an environment, e.g., to replace (or supplement) legacy lighting units that are controlled by legacy lighting control components, such as traditional switches (e.g., wall switches, dimmers, lamp switches, clappers, etc.) or sensors (e.g., presence, light, touch, etc.). While it is possible to replace legacy lighting control components with more flexible connected lighting control components that control connected lighting units wirelessly, such installation may be expensive, cumbersome or otherwise undesirable. Moreover, some users may prefer to continue controlling connected lighting units using legacy lighting control components.

Thus, there is a need in the art to incorporate legacy lighting control components into a connected lighting system. More generally, Applicants have recognized and appreciated that it would be beneficial to enable a user to logically incorporate a legacy lighting control component into a connected lighting system. In view of the foregoing, various embodiments and implementations of the present invention are directed to apparatus, systems, methods and computer-readable media (transitory and non-transitory) for implementing a logical "proxy" to a legacy lighting control component that enables users to create associations between legacy lighting control components and lighting scenes.

Figure 1:
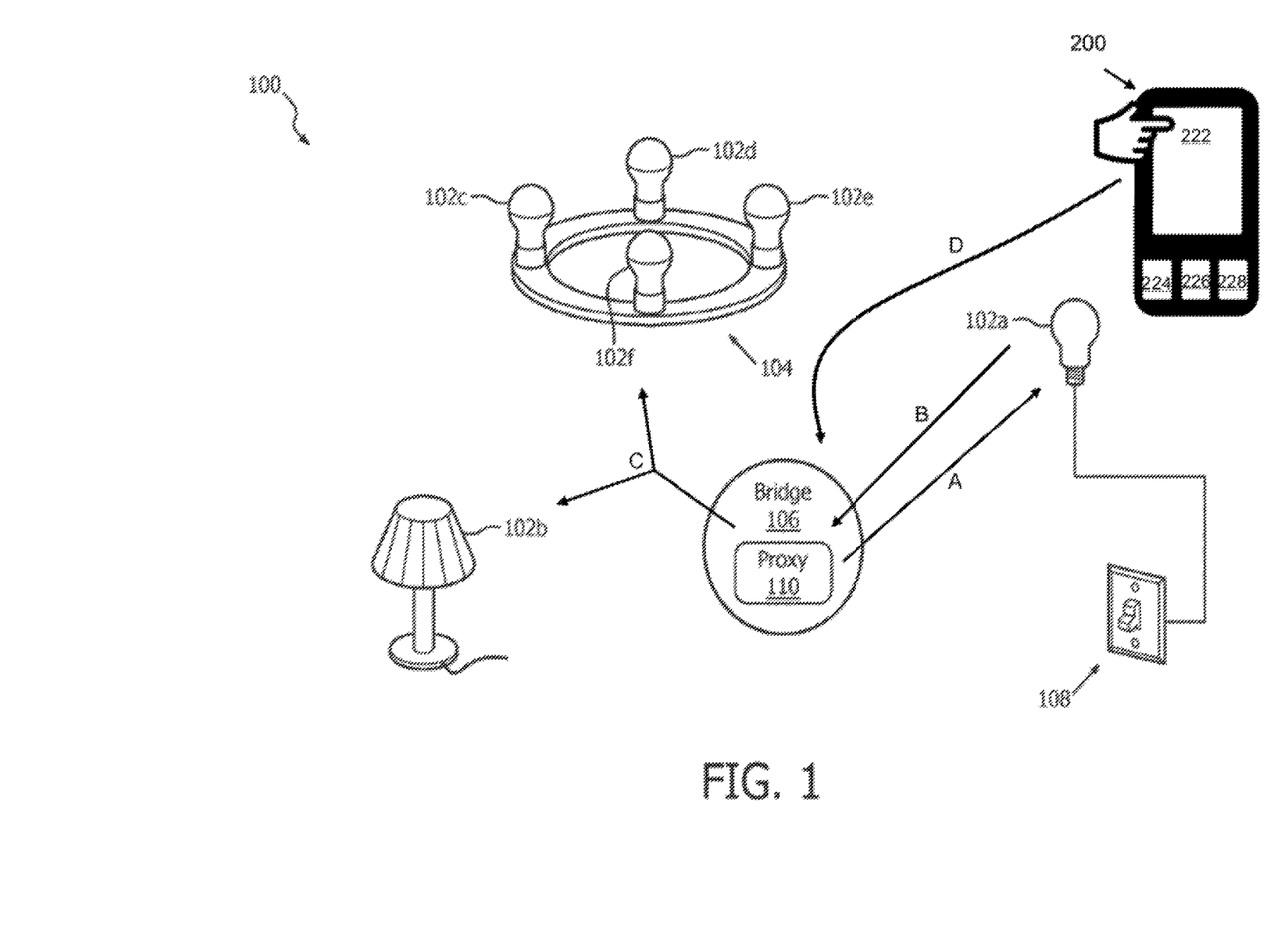
FIG. 1 illustrates an environment in which a proxy may be implemented for a legacy lighting control component, in accordance with various embodiments.

Referring to FIG. 1, in one embodiment, a lighting system 100 may include a plurality of connected lighting units 102a-f (referred to generically as "lighting units 102"). Lighting units 102a-f may include various forms of light sources, including but not limited to LED, incandescent, fluorescent, halogen, and so forth. Lighting units 102 may be installed in various types of luminaires. For example, a hanging luminaire 104 includes lighting units 102c-f. Lighting unit 102b is installed in a tabletop lamp.

A lighting system bridge 106 may be communicably coupled with various network nodes such as plurality of lighting units 102a-f. As used herein, "communicably coupled with" means to be in wired or wireless communication with, and/or to be capable of exchanging information with, e.g., using various technologies such as Wi-Fi, BlueTooth, ad hoc technologies (such as ZigBee), coded light, near field communication ("NFC"), and so forth. By contrast, "electrically coupled with" as used herein means to be in electrical communication with, e.g., powered by. For instance, in FIG. 1, lighting unit 102a is electrically coupled with (but not communicably coupled with) a legacy lighting control component in the form of a wall switch 108. Wall switch 108 may be operated (e.g., toggled between up and down positions) to energize or de-energize (i.e. turn on or off) lighting unit 102a. However, wall switch 108 may not be capable of exchanging information with lighting unit 102a, or other components of lighting system 100 for that matter.

There may be instances where a user wishes to implement a particular lighting scene in response to operation of wall switch 108, in spite of the fact that wall switch 108 is not in communication with other components of lighting system 100. A "lighting scene" may include one or more desired properties of light to be emitted by one or more lighting units. Non-limiting examples of lighting scenes include a romantic scene (e.g., where lighting units 102 emit various shades of red, pink and white, and/or are dimmed), an underwater scene (e.g., where lighting units emit various blues and greens, in some cases flickering slightly to mimic waves), a working scene (e.g., where lighting units 102 emit light with high intensity to illuminate a project), a nighttime scene (e.g., where lighting units 102 emit soft light sufficient to illuminate a path to a bathroom), and so forth.

Accordingly, in various embodiments, a proxy 110 may be implemented to act as a proxy of wall switch 108 (or another legacy lighting control component). Proxy 110 may be implemented on various network nodes, such as lighting system bridge 106, one or more lighting units 102, or another network node, using any combination of hardware and software. In various embodiments, proxy 110 may be configured to poll various components of lighting system 100, such as lighting unit 102a or lighting system bridge 106, for data indicative of a lighting state of lighting unit 102.as shown at A in FIG.1. As used herein, to "poll" for a state of a lighting unit means to request from some network node (e.g., lighting system bridge 106, lighting unit 102a) computer-readable data indicative of a state of the lighting unit.

Proxy 110 may determine, e.g., based on the polling, that a lighting state of lighting unit 102a corresponds to a predetermined lighting state caused by actuation of wall switch 108.as shown at B in FIG. 1. For instance, lighting system bridge 106 may set a status of a lighting unit 102 to "reachable" when lighting unit 102a joins lighting system 100 and/or is energized. When proxy 110 determines, e.g., based on the periodic polling, that lighting unit 102a has been energized in response to actuation of wall switch 108, proxy 110 may identify and/or select (e.g., from a plurality of lighting scenes) a corresponding lighting scene.

Once the predetermined lighting scene is identified and/or selected, proxy 110 may cause one or more other lighting units 102b-f to implement the predetermined lighting scene in various ways. For example, in some embodiments (e.g., where proxy 110 is implemented on lighting system bridge 106), proxy 110 may transmit to the one or more other lighting units 102b-f one or more commands to implement one or more respective aspects of the predetermined lighting scene as shown in C in FIG. 1. As another example, proxy 110 may transmit to lighting system bridge 106 (assuming they are separate) an indication that the lighting state of lighting unit 102a corresponds to the predetermined lighting state. Lighting system bridge 106 may then react accordingly, e.g., by causing one or more other lighting units 102b-f to implement the predetermined lighting scene. As yet another example, proxy 110 may transmit to lighting system bridge 106 a command to cause lighting system bridge 106 to cause the one or more other lighting units 102b-f to implement the predetermined lighting scene.

In various embodiments, a predetermined lighting scene implemented as a result of operation of wall switch 108 may be "unimplemented" or ceased in a similar manner. Proxy 110 may continue to periodically poll one or more components of lighting system 100 (e.g., lighting system bridge 106, lighting unit 102a) for a status of lighting unit 102a. When a user switches wall switch 108 off, lighting unit 102a may transition from a "reachable" status to another lighting state, such as "unreachable." On determining that lighting unit 102 has been transitioned from the "reachable" state into the "unreachable" state, proxy 110 may cause the one or more other lighting units 102b-f to cease implementation of the predetermined lighting scene, e.g., in manners similar to how it caused them to implement the predetermined lighting scene.

In this manner, wall switch 108 (or other similar legacy lighting control components) may be logically incorporated into a connected lighting system, in spite of their inability to communicate with connected lighting system components.

Figure 2:
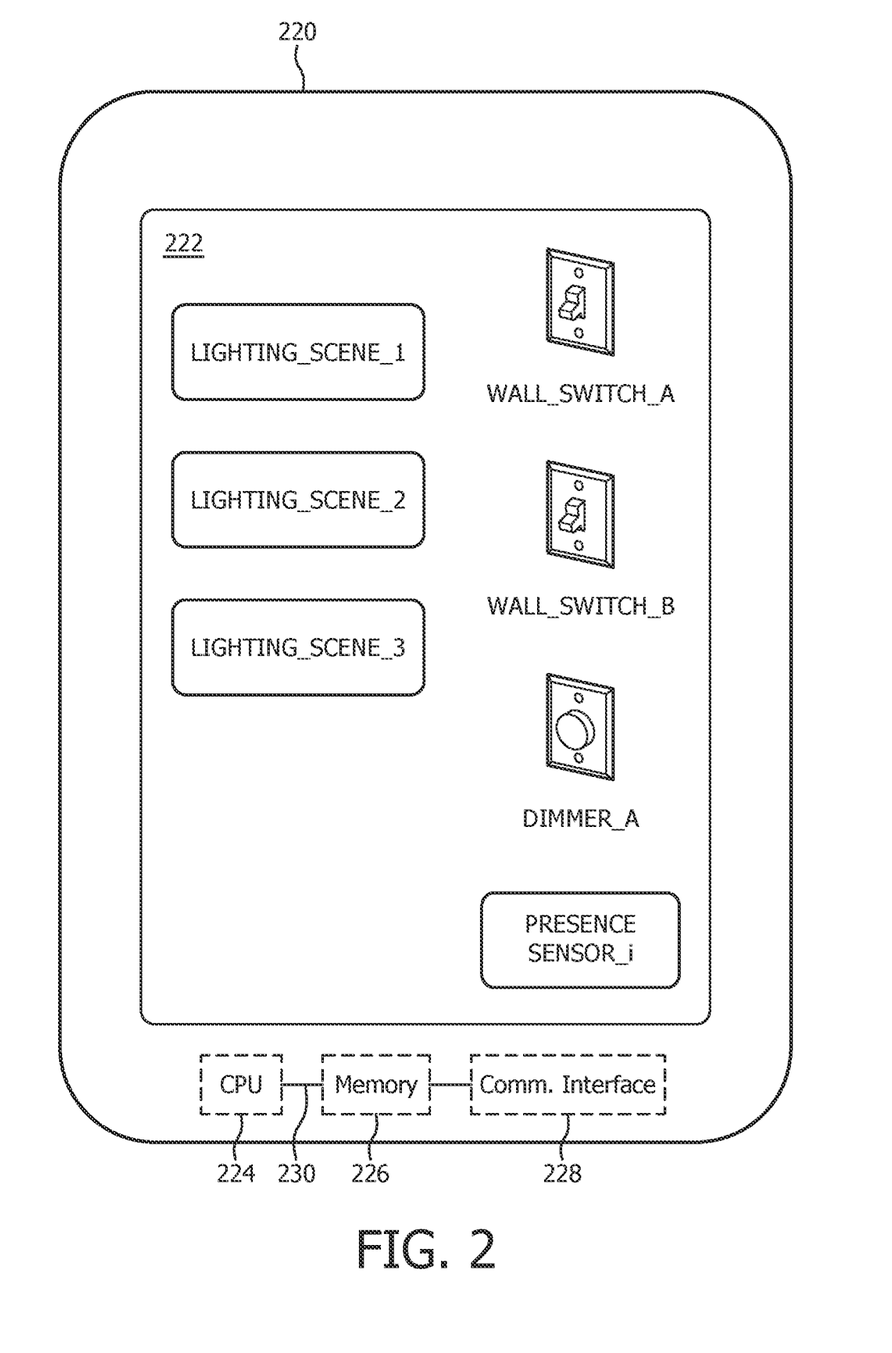
FIGS. 2-3 depicts example user interfaces for configuring a proxy for a legacy lighting control component, in accordance with various embodiments.

Referring now to FIG. 2, a computing device in the form of a mobile computing device 220 that is operable to configure lighting systems such as 100 is depicted. In this example, mobile computing device 220 may be a smart phone or tablet computing device. However, in other examples, other types of computing devices may be used to configure lighting systems, including but not limited to desktops, laptops, wearable computing devices (e.g., smart watches, smart glasses), set top boxes, and so forth.

Computing device 220 may include various output components, including a touchscreen 222 (which is also an input component), as well as others, such as speakers, vibration units, and so forth. As a computing device, mobile computing device 220 may include various standard computing components, including one or more processors (e.g., CPU 224), memory 226 (e.g., RAM, ROM, flash, SSD, etc.), one or more wired and/or wireless communication interfaces (e.g., "COMM. INTERFACE 228"), and so forth, one or more of which may be operably coupled to each other via one or more buses 230. In various embodiments, mobile computing device 220 may wirelessly communicate with one or more lighting units (e.g., 102) and/or with a lighting system bridge (e.g., 106).

In FIG. 2, computing device 220 has rendered on touchscreen 222 a user interface that includes a number of graphical icons representing various components of and relating to a lighting system. For example, LIGHTING_SCENE_1, LIGHTING_SCENE_2, AND LIGHTING_SCENE_3 may represent three different lighting scenes that may be implemented by a plurality of lighting units. WALL_SWITCH_A and WALL_SWITCH_B may represent legacy wall switches (e.g., 108 in FIG. 1), and DIMMER_A may represent a legacy dimmer switch. While not depicted in FIG. 2, each of these legacy lighting control components may be operable to control a particular lighting unit. For instance, WALL_SWITCH_1 may be wall switch 108 of FIG. 1, which as described previously controls lighting unit 102a. PRESENCE_SENSOR_i may represent a presence sensor that when triggered causes power to be provided to one or more lighting units so that they become energized.

In various embodiments, the graphical icons of FIG. 2 may be "dragged" onto one another to create associations between them. In various embodiments, mobile computing device 220 may transmit to proxy 110 (and/or lighting system bridge 106 and/or one or more lighting units 102) data indicative of these associations as shown at D in FIG. 1. Proxy 110 may then store these associations, e.g., in a lookup table. Later, when legacy lighting control components are actuated, proxy 110 may consult the lookup table to determine which lighting unit is controlled by the legacy lighting control component and/or which predetermined lighting scene is to be implemented.

For example, LIGHTING_SCENE_1 may be dragged onto WALL_SWITCH_A to create a new proxy (110) (or configure an existing proxy) on behalf of wall switch 108 in FIG. 1. Thereafter, when wall switch 108 is actuated, proxy 110 may detect that wall switch 108 has been actuated (e.g., by polling for a lighting state of lighting unit 102a), and may cause other lighting units to implement LIGHTING_SCENE_1 in response.

A connected lighting unit such as lighting unit 102a may be controllable by both a legacy lighting control component (e.g., wall switch 108) and by connected lighting control components such as lighting system bridge 106 (e.g., in response to user commands received from mobile computing device 220). To distinguish between a lighting unit being operated by a legacy lighting control component and a lighting unit being controlled by a connected lighting component, one or more components of a lighting system may determine a lighting state into which a particular lighting unit is transitioned in response to activation of a corresponding legacy lighting control component. This determination may be made in various ways.

For instance, in FIG. 1, lighting unit 102a may be transitioned between fully energized and fully de-energized by operation of wall switch 108. A user may operate a user interface, e.g., rendered on mobile computing device 220, to indicate, e.g., to proxy 110, that the fully energized state of lighting unit 102a is caused by actuation of wall switch 108. Proxy 110 may thereafter associate lighting unit 102a being transitioned into a fully-energized state with operation of wall switch 108. It is possible that a connected lighting control component such as mobile computing device 220 may be operated to cause lighting unit 102a to enter a fully-energized state, thereby also triggering implementation of a corresponding lighting scene by proxy 110. However, a user may desire that when lighting unit 102a is fully energized, the same lighting scene be implemented regardless of what brought lighting unit 102 into that state.

As an alternative, in some embodiments, proxy 110 may be configured to distinguish between when lighting unit 102a is fully energized in response to operation of wall switch 108 and when lighting unit 102a is fully energized in response to operation of mobile computing device 220. For instance, proxy 110 may monitor for commands received, e.g., at lighting system bridge 106. Proxy 110 may then interpret only those instances where full energizing of lighting unit 102a occurs un-contemporaneously with commands being received at lighting system bridge 106 as being instances where a particular lighting scene should be implemented.

As another alternative, in some embodiments, proxy 110 may be configured to determine when a lighting state of lighting unit 102a is "powered," which is caused by operation of wall switch 108, and which may be independent of the light actually emitted by lighting unit 102a. In some embodiments, when lighting unit 102a is powered, its lighting state (e.g., as maintained by lighting system bridge 106) may be "reachable." For instance, lighting unit 102a may be powered on by operation of wall switch 108, and may remain powered in spite of being subsequently caused to emit no light, e.g., in response to a command received from lighting system bridge 106. In such embodiments, proxy 110 may cause other lighting units to implement a particular lighting scene in response to lighting unit 102a being powered, regardless of the light it emits.

In some embodiments, a user may configure proxy 110 to selectively cause implementation of various lighting scenes based on multiple aspects of the state of lighting unit 102a. For instance, proxy 110 may be configured to cause implementation of one lighting scene in response to lighting unit 102a being "reachable" and being fully energized, and may cause implementation of another lighting scene in response to lighting unit 102a being "reachable" but being less than fully energized (or emitting light of a particular hue, or having a particular effect).

If the operable relationship between wall switch 108 and lighting unit 102a is known to proxy 110 (or to lighting system bridge 106 or another component of lighting system 100), then that relationship may remain transparent to the user, who may only be aware of the relationships he or she can create between lighting scenes and legacy lighting control components using interfaces such as that depicted in FIG. 2. However, in some embodiments, a relationship between a lighting unit and a legacy lighting component that controls it may be created ahead of time, e.g., by an administrative user and/or technician.

Figure 3:
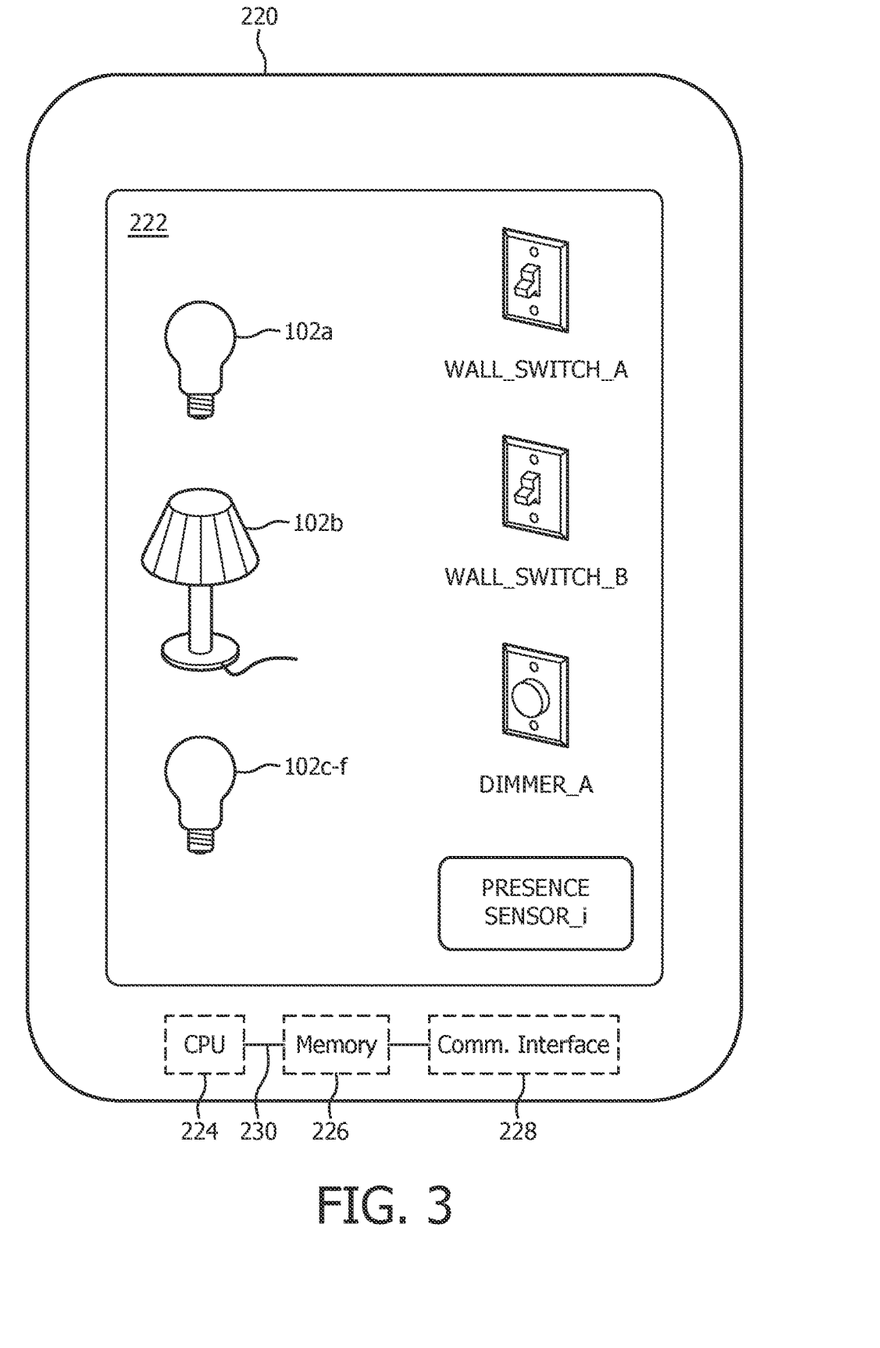

FIG. 3 depicts an example of mobile computing device 220 rendering an interface that is operable to create associations between legacy lighting control components and connected lighting units of FIG. 1. A first graphical icon represents lighting unit 102a, a second graphical icon represents lighting unit 102b, and a third graphical icon represents the lighting units 102c-f that are installed in luminaire 104. An expert user such as a technician or a relatively technologically-savvy user at a home may create relationships between the lighting units these graphical elements represent and the legacy lighting control components represented by the graphical icons on the right, e.g., by dragging icons onto each other. Subsequent users who may be relatively less sophisticated may then operate the interface depicted in FIG. 2, without need to operate the interface depicted in FIG. 3.

In addition to or instead of a user operating a rendered user interface to associate legacy lighting control components with connected lighting units, in some embodiments, other techniques may be used to create such associations. In some embodiments, proxy 110 may be configured to be "aware" of a type of legacy lighting control device it is a proxy for. Thus, a network node on which proxy 110 is implemented may be equipped with means to configure proxy 110 for the type of legacy lighting control component device. That way, proxy 110 may send compatible commands (e.g., ZigBee messages) as if it were a "connected" version of the legacy lighting control components. Those means for configuring proxy 110 may include but are not limited to physical components on a network node (e.g., dip switches, knobs, buttons, etc.), or other interfaces (e.g., an interactive web page published by proxy 110, a touch screen on a network node implementing proxy 110, etc.).

Figure 4:
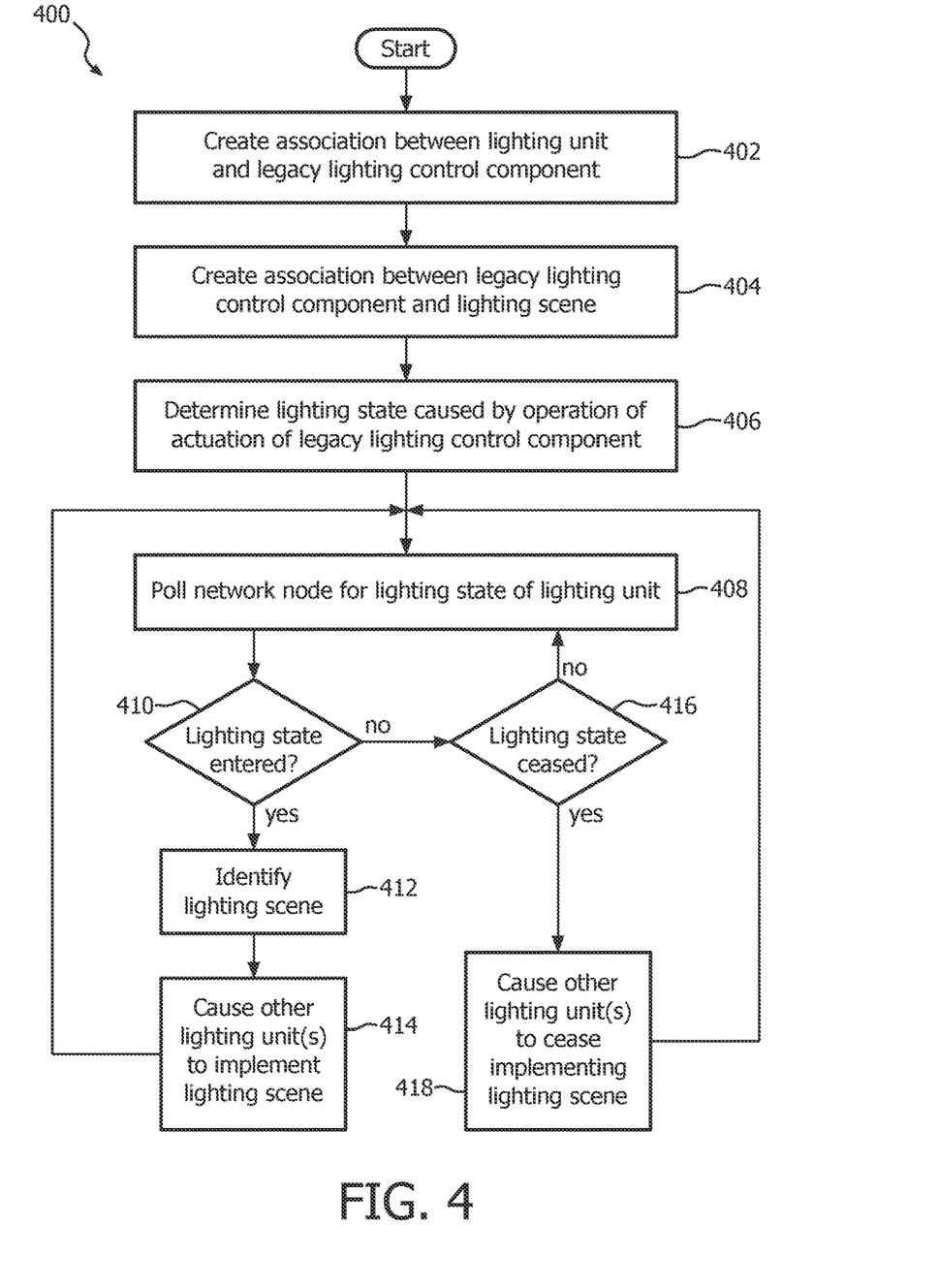
FIG. 4 depicts an example method of configuring and operating a proxy for a legacy lighting control component, in accordance with various embodiments.

FIG. 4 depicts an example method 400, selected aspects which may be performed by various network nodes of a lighting system. At block 402, an association may be created between a lighting unit and a legacy lighting control component. For instance, a user may operate the user interface depicted in FIG. 3 to create an association between lighting unit 102a and wall switch 108. Data indicative of that association may then be transmitted by mobile computing device 220 to lighting system bridge 106 or another network node of lighting system 100.

At block 404, an association may be created between a legacy lighting control component and a predetermined lighting scene. For instance, as shown in FIG. 1 a user may operate the user interface depicted in FIG. 2 to create an association between wall switch 108 and LIGHTING_SCENE_1. Data indicative of that association may then be transmitted by mobile computing device 220 to lighting system bridge 106 as shown at D in FIG. 1 or another network node of lighting system 100.

At block 406, a lighting state of the lighting unit that is caused by operation of the legacy lighting component may be determined. For instance, in some embodiments, a user may operate mobile computing device 220 to cause lighting system bridge 106, lighting unit 102a, or another lighting system network node to enter into a "lighting state detection mode." While in this mode, wall switch 108 may be operated to transition lighting unit 102a into whatever state (e.g., fully-energized) it enters when wall switch 108 is operated. Lighting system bridge 106 or another network node may then detect this lighting state (e.g., using a light sensor or by polling a network node such as lighting system bridge 106 or lighting unit 102a for computer-readable data indicative of its state) and may characterize that lighting state as being a result of operation of wall switch 108.

For example, lighting system bridge 106 may, in response to polling, provide an indication that lighting unit 102a is "reachable" (or may use another ZigBee Light Link, or "ZLL," parameter). Or, lighting unit 102a itself may, on activation, announce itself to a ZigBee-based network. Or, a user may manually operate mobile computing device 220 to configure the lighting state resulting from operation of wall switch 108. This determined lighting state may thereafter be mapped, e.g., by lighting system bridge 106 or another network node, to the predetermined lighting scene that was associated with wall switch at block 402.

At block 408, a network node such as lighting system bridge 106 or lighting unit 102a itself may be polled, e.g., periodically by proxy 110, to determine a lighting state of lighting unit 102a. At block 410, if the lighting unit has entered the lighting state determined at block 406, then method 400 may proceed to block 412. At block 412, proxy 110 or another network node (e.g., lighting system bridge 106, lighting unit 102a) may identify a lighting scene that is triggered by actuation of the legacy lighting component. At block 414, other lighting units may be caused to implement the identified lighting scene.

Back at block 410, if the lighting unit has not entered into the lighting state determined at block 406, at block 416, it may be determined whether the lighting unit has transitioned from the lighting state determined at block 406 into another state (e.g., energized to de-energized). If the answer is no, then method 400 may proceed back to block 408. However, if the answer at block 416 is yes, then at block 418, the other lighting units may be caused, e.g., by proxy 110 or lighting system bridge 106, to cease implementation of the lighting scene.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. A lighting control method, comprising:
    requesting, by a processor of a network node, data from a lighting unit that is indicative of a lighting state of the lighting unit, wherein the lighting state transitions in response to activation of a legacy switch or sensor;
    determining, by the processor of the network node based on the data, that the lighting state of the lighting unit corresponds to a predetermined lighting state;
    identifying, by the processor of the network node based on the determining, a predetermined lighting scene triggered by transition of the lighting unit into the predetermined lighting state;
    causing, by the processor of the network node, one or more other lighting units to implement the predetermined lighting scene;
    determining, by the network node based on the requesting, that the lighting unit has been transitioned from the predetermined lighting state into another lighting state; and
    causing, by the network node, the one or more other lighting units to cease implementation of the predetermined lighting scene in response to determining that the lighting unit has been transitioned from the predetermined lighting state into the another lighting state.

2. The lighting control method of claim 1, further comprising providing, at a computing device in communication with the network node, a user interface operable by a user to create an association directly between a legacy switch or sensor that controls the lighting state of the lighting unit and the predetermined lighting scene.

3. The lighting control method of claim 2, wherein the user interface is further operable by a user to create an association between the legacy switch or sensor and the lighting unit.

4. The lighting control method of claim 1, wherein the predetermined lighting state is an energized lighting state and the another lighting state is a de-energized lighting state.

5. The lighting control method of claim 4, wherein determining that a lighting unit has transitioned into the energized lighting state comprises determining, by the network node, that the lighting unit has been energized by operation of a legacy switch.

6. The lighting control method of claim 4, wherein determining that a lighting unit has transitioned into the energized lighting state comprises determining, by the network node, that the lighting unit has been energized in response to a signal from a legacy sensor.

7. The lighting control method of claim 1, wherein determining that a lighting unit has transitioned into a predetermined lighting state comprises determining, by the network node, that the lighting unit is reachable.

8. The lighting control method of claim 1, wherein causing the one or more other lighting units to implement the predetermined lighting scene comprises transmitting, by the network node to the one or more other lighting units, one or more commands to implement one or more respective aspects of the predetermined lighting scene.

9. The lighting control method of claim 1, wherein causing the one or more lighting units to implement the predetermined lighting scene comprises transmitting, by the network node to a lighting system bridge, an indication that the lighting state of the lighting unit corresponds to the predetermined lighting state.

cause the second lighting unit to cease implementation of the lighting scene.

10. The lighting control method of claim 1, wherein causing the one or more lighting units to implement the predetermined lighting scene comprises transmitting, by the network node to a lighting system bridge, a command to cause the lighting system bridge to cause the one or more lighting units to implement the predetermined lighting scene.

11. A lighting system bridge adapted to control a lighting system, the lighting system bridge configured to:
  receive, via a communication interface, from a computing device communicably coupled with the lighting system bridge, data indicative of a user-created association between a legacy switch or sensor that controls a first lighting unit of the lighting system and a lighting scene to be implemented at least in part by a second lighting unit of the lighting system;
  determine a lighting state into which the first lighting unit is transitioned in response to activation of the legacy switch or sensor;
  create an association between the determined lighting state and the lighting scene; and
  cause at least the second lighting unit to implement a portion of the lighting scene in response to a determination that the first lighting unit has transitioned into the determined lighting state.

12. The lighting system bridge of claim 11, further configured to periodically request data from the first lighting unit that is indicative of a current lighting state of the first lighting unit, wherein the determination that the first lighting unit has transitioned into the determined lighting state is based on the requested data.

13. The lighting system bridge of claim 12, further configured to:
  determine, based on the data indicative of the current lighting state, that the first lighting unit has been transitioned from the determined lighting state into another lighting state; and
  cause the second lighting unit to cease implementation of the lighting scene.

14. The lighting system bridge of claim 11, further configured to receive, from the computing device, data indicative of an association between the legacy switch or sensor and the first lighting unit.

15. The lighting system bridge of claim 11, further configured to receive, from the computing device, data indicative of the lighting state into which the first lighting unit is transitioned in response to activation of the legacy switch or sensor.

16. A mobile computing device comprising:
  one or more processors;
  a communication interface operably coupled with the one or more processors;
  a display; and
  memory adapted to store instructions;
  wherein the one or more processors, in response to execution of the instructions, are arranged to:
    render, on the display, a user interface operable by a user to create an association between a legacy switch or sensor that controls a first lighting unit and a predetermined lighting scene to be implemented at least in part by a second lighting unit; and
    provide, via the communication interface to a network node in communication with the first and second lighting units, data indicative of the association.

17. The mobile computing device of claim 16, wherein the association is a first association, and the user interface is further operable by a user to create a second association between the legacy switch or sensor and the first lighting unit.

18. The mobile computing device of claim 16, wherein the user interface is further operable by a user to provide data indicative of a lighting state into which the first lighting unit is transitioned in response to activation of the legacy switch or sensor.

19. The mobile computing device of claim 16, wherein the association is a first association, and the user interface is further operable by a user to create a second association between a lighting state into which the first lighting unit is transitioned in response to activation of the legacy switch or sensor and the predetermined lighting scene.

* * * * *